(12) United States Patent
Gass et al.

(10) Patent No.: US 9,573,422 B2
(45) Date of Patent: Feb. 21, 2017

(54) NON-PNEUMATIC TIRE

(71) Applicant: POLARIS INDUSTRIES INC., Medina, MN (US)

(72) Inventors: Donald Brett Gass, Dreieich (DE); Jeffrey D. Bennett, Roseau, MN (US); Louis J. Brady, Wyoming, MN (US); Eric J. Borud, Roseau, MN (US); David J. Koenig, Wyoming, MN (US); Keith W. Peppel, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 315 days.

(21) Appl. No.: 13/802,474

(22) Filed: Mar. 13, 2013

(65) Prior Publication Data
US 2013/0240272 A1  Sep. 19, 2013

Related U.S. Application Data

(60) Provisional application No. 61/611,300, filed on Mar. 15, 2012.

(51) Int. Cl.
*B60C 7/12* (2006.01)
*B60B 9/00* (2006.01)
(Continued)

(52) U.S. Cl.
CPC .............. *B60C 7/125* (2013.01); *B60B 9/00* (2013.01); *B60B 9/26* (2013.01); *B60C 7/105* (2013.04);
(Continued)

(58) Field of Classification Search
CPC .............. B60B 9/00; B60B 9/02; B60B 9/10; B60B 9/12; B60B 9/16; B60B 9/18; B60B 9/20; B60B 9/22; B60B 9/26; B60C 7/12; B60C 7/125
(Continued)

(56) References Cited

U.S. PATENT DOCUMENTS 576,072 A  1/1897  Humbrecht
617,054 A  1/1899  Schlick
(Continued)

FOREIGN PATENT DOCUMENTS

BE  367854 A  2/1930
CN  86106585 A  7/1987
(Continued)

OTHER PUBLICATIONS

Chinese Notification of Decision of Rejection for Application No. CN 200880010003.6, dated Jun. 17, 2011; 15 pages.
(Continued)

*Primary Examiner* — Jason Bellinger
(74) *Attorney, Agent, or Firm* — Faegre Baker Daniels LLP

(57) ABSTRACT

A non-pneumatic tire is disclosed where a resilient wheel is mounted on a rim and the wheel has an inner ring, an outer ring and a plurality of flexible webs interconnected between the inner and outer rings. The flexible webs define openings in through the resilient wheel. The stiffness of the inner wheel at a position adjacent to the inner face is different than the stiffness of the inner wheel at a position adjacent to the outer face. This stiffness difference can be accomplished by providing inflated membranes in at least some of the openings or by molding the wheel with an asymmetric parting line. In addition, the wheels could be dynamically controlled by providing magnetically actuable membranes in some of the openings.

32 Claims, 16 Drawing Sheets

(51) Int. Cl.
*B60C 7/10* (2006.01)
*B60B 9/26* (2006.01)
*B60C 7/18* (2006.01)
*B60B 5/02* (2006.01)

(52) U.S. Cl.
CPC .. *B60C 7/18* (2013.01); *B60B 5/02* (2013.01); *B60B 2310/204* (2013.01); *B60B 2900/131* (2013.01); *B60B 2900/313* (2013.01); *B60B 2900/931* (2013.01)

(58) Field of Classification Search
USPC ....... 152/5, 7, 40, 41, 42, 43, 44, 47, 53, 30
See application file for complete search history.

(56) References Cited

U.S. PATENT DOCUMENTS

| | | | |
|---|---|---|---|
| 637,200 A | 11/1899 | Finin | |
| 654,897 A | 7/1900 | Keller | |
| 690,872 A | 1/1902 | Peck | |
| 748,797 A | 1/1904 | Schwieger | |
| 793,003 A | 6/1905 | Mathey | |
| 798,185 A | 8/1905 | Irwin | |
| 811,232 A | 1/1906 | Lang et al. | |
| 818,568 A | 4/1906 | Sims | |
| 820,077 A | 5/1906 | Whiteley | |
| 822,021 A | 5/1906 | Sanderson | |
| 856,957 A | 6/1907 | Hubbard | |
| 906,804 A | 12/1908 | Kempshall | |
| 927,154 A | 7/1909 | Martin | |
| 946,617 A | 1/1910 | Saylor | |
| 987,340 A | 3/1911 | Besler | |
| 1,041,829 A | 10/1912 | Mallory | |
| 1,042,035 A | 10/1912 | Ray | |
| 1,057,734 A | 4/1913 | Harrison | |
| 1,060,480 A | 4/1913 | Minnick | |
| 1,066,267 A | 7/1913 | Gerleit | |
| 1,085,700 A | 2/1914 | Percy | |
| 1,101,702 A | 6/1914 | Lakoff | |
| 1,106,238 A | 8/1914 | Papadopoulos | |
| 1,136,546 A | 4/1915 | Markson | |
| 1,146,654 A | 7/1915 | Rietschel | |
| 1,147,600 A | 7/1915 | Borland | |
| 1,154,504 A | 9/1915 | Gano | |
| 1,156,311 A | 10/1915 | Rabey | |
| 1,190,874 A | 7/1916 | Durfee | |
| 1,227,791 A | 5/1917 | Huebner | |
| 1,232,127 A | 7/1917 | Uhrinecz et al. | |
| 1,242,269 A | 10/1917 | Teeple | |
| 1,244,276 A | 10/1917 | Anglemyer | |
| 1,252,736 A | 1/1918 | Szakacs | |
| 1,262,501 A | 4/1918 | Huetter | |
| 1,262,550 A | 4/1918 | Northern | |
| 1,268,078 A | 5/1918 | Lambert | |
| 1,282,690 A | 10/1918 | Hamlin | |
| 1,286,634 A | 12/1918 | Holland | |
| 1,287,255 A | 12/1918 | De Carmona | |
| 1,292,729 A | 1/1919 | Drach | |
| 1,300,933 A | 4/1919 | Divers | |
| 1,349,914 A | 8/1920 | Pratt | |
| 1,365,181 A | 1/1921 | Marzak et al. | |
| 1,414,543 A | 5/1922 | Bessler | |
| 1,414,544 A | 5/1922 | Bessler | |
| 1,451,517 A | 4/1923 | Smith | |
| 1,456,775 A * | 5/1923 | Hicks | 152/328 |
| 1,461,928 A | 7/1923 | Miller | |
| 1,493,922 A | 5/1924 | Deister | |
| 1,502,908 A | 7/1924 | Cozatt | |
| 1,557,437 A | 10/1925 | Dodge | |
| 1,640,613 A | 8/1927 | Miller | |
| 1,660,845 A | 2/1928 | Mamessier | |
| 1,710,524 A | 4/1929 | Vitenko | |
| 1,753,735 A | 4/1930 | Athey | |
| 1,788,042 A | 1/1931 | Bardaxoglu | |
| 1,841,773 A * | 1/1932 | Worsley et al. | 152/328 |
| 1,887,019 A | 11/1932 | Hart | |
| 1,948,412 A | 2/1934 | Bennett | |
| 2,055,461 A | 9/1936 | Baddock | |
| 2,235,378 A | 3/1941 | Martin | |
| 2,283,274 A | 5/1942 | Martin | |
| 2,298,142 A | 10/1942 | Martin | |
| 2,298,172 A | 10/1942 | Rose et al. | |
| 2,331,212 A | 10/1943 | Martin | |
| 2,341,721 A | 2/1944 | Kapp | |
| 2,492,433 A | 12/1949 | Martin | |
| 2,620,844 A | 12/1952 | Lord | |
| 2,701,431 A | 2/1955 | Whitesell | |
| 2,705,539 A | 4/1955 | Martin | |
| 2,742,941 A | 4/1956 | Johnson | |
| 2,912,032 A | 11/1959 | Alexander | |
| 3,022,810 A | 2/1962 | Lambe | |
| 3,182,705 A | 5/1965 | Markow | |
| 3,188,775 A | 6/1965 | Cosmos | |
| 3,217,776 A * | 11/1965 | Ellenrieder | B29D 30/66 152/209.9 |
| 3,219,090 A | 11/1965 | Cislo | |
| 3,237,667 A | 3/1966 | Lindley | |
| 3,286,756 A * | 11/1966 | Ellenrieder | B60C 11/01 152/209.14 |
| 3,311,149 A | 3/1967 | Mathiesen | |
| 3,380,779 A | 4/1968 | Albright | |
| 3,381,735 A | 5/1968 | Talcott et al. | |
| 3,465,804 A | 9/1969 | Dupre | |
| 3,493,027 A | 2/1970 | Dewhirst et al. | |
| 3,635,273 A | 1/1972 | Patecell | |
| 3,759,306 A | 9/1973 | Greiner et al. | |
| 3,854,516 A | 12/1974 | Burnell | |
| 3,907,018 A | 9/1975 | Fujikawa et al. | |
| 3,957,101 A | 5/1976 | Ippen et al. | |
| 4,014,418 A | 3/1977 | Ikeda et al. | |
| 4,054,476 A | 10/1977 | Hara et al. | |
| 4,058,152 A | 11/1977 | Beck et al. | |
| 4,071,070 A | 1/1978 | Schmidt | |
| 4,108,228 A | 8/1978 | Tiemann | |
| 4,111,249 A | 9/1978 | Markow | |
| 4,153,095 A | 5/1979 | Sarkissian | |
| 4,169,494 A | 10/1979 | Kubica et al. | |
| 4,226,273 A | 10/1980 | Long et al. | |
| 4,235,270 A | 11/1980 | Kahaner et al. | |
| 4,244,413 A | 1/1981 | Takahashi et al. | |
| 4,262,726 A | 4/1981 | Welter | |
| 4,287,927 A | 9/1981 | Caravito et al. | |
| 4,294,730 A | 10/1981 | Kenney | |
| 4,350,196 A | 9/1982 | Hampshire | |
| 4,366,015 A | 12/1982 | Murray | |
| 4,425,953 A | 1/1984 | Rohde et al. | |
| 4,447,093 A | 5/1984 | Cunard et al. | |
| 4,459,167 A | 7/1984 | Markow et al. | |
| 4,549,592 A | 10/1985 | Schroder | |
| 4,553,577 A | 11/1985 | Gregg | |
| 4,558,727 A | 12/1985 | Golata et al. | |
| 4,673,014 A | 6/1987 | Markow | |
| 4,705,087 A | 11/1987 | Markow | |
| 4,749,345 A | 6/1988 | Warmuth et al. | |
| 4,769,416 A | 9/1988 | Gelling et al. | |
| 4,784,201 A | 11/1988 | Palinkas et al. | |
| 4,832,098 A | 5/1989 | Palinkas et al. | |
| 4,848,429 A * | 7/1989 | Mezzanotte | B60C 3/06 152/209.5 |
| 4,894,281 A | 1/1990 | Yagi et al. | |
| 4,917,162 A | 4/1990 | De Longcamp et al. | |
| 4,921,029 A | 5/1990 | Palinkas et al. | |
| 4,934,425 A | 6/1990 | Gajewski et al. | |
| 4,945,962 A | 8/1990 | Pajtas | |
| 5,023,040 A | 6/1991 | Gejewski et al. | |
| 5,042,544 A | 8/1991 | Dehasse | |
| 5,050,656 A | 9/1991 | Ho | |
| 5,073,444 A | 12/1991 | Shanelec | |
| 5,086,815 A | 2/1992 | Panaroni et al. | |
| 5,139,066 A | 8/1992 | Jarman | |
| 5,168,910 A | 12/1992 | Zhang et al. | |
| 5,174,634 A | 12/1992 | Blanck et al. | |
| 5,180,455 A * | 1/1993 | Cheng | 152/338.1 |
| 5,223,599 A | 6/1993 | Gaejewski | |

(56) References Cited

U.S. PATENT DOCUMENTS

| | | |
|---|---|---|
| 5,236,027 A | 8/1993 | Lu |
| 5,265,659 A | 11/1993 | Pajtas et al. |
| 5,343,916 A | 9/1994 | Duddey et al. |
| 5,353,853 A | 10/1994 | Hansson |
| 5,372,171 A * | 12/1994 | Miyazaki ............ B60C 11/0302 152/209.8 |
| 5,460,213 A | 10/1995 | Pajtas |
| 5,494,090 A | 2/1996 | Kejha |
| 5,520,232 A * | 5/1996 | Fukutake et al. ............. 152/267 |
| 5,535,800 A | 7/1996 | Abbott |
| 5,690,872 A | 11/1997 | Krieg et al. |
| 5,743,316 A | 4/1998 | Chrobak |
| 5,823,634 A | 10/1998 | Pazzobon |
| 5,961,760 A | 10/1999 | Tajima et al. |
| 6,050,312 A * | 4/2000 | Hsu ............................. 152/157 |
| 6,170,544 B1 | 1/2001 | Hottebart |
| 6,187,245 B1 | 2/2001 | Hedley |
| 6,257,604 B1 | 7/2001 | Laurent et al. |
| 6,269,855 B1 * | 8/2001 | Elgendi ...................... 152/333.1 |
| 6,279,630 B1 | 8/2001 | Herbert |
| 6,286,572 B1 | 9/2001 | Chen |
| 6,298,891 B1 | 10/2001 | Harris |
| 6,364,424 B1 | 4/2002 | Lashlee et al. |
| 6,374,887 B1 | 4/2002 | Subotics |
| 6,394,407 B1 | 5/2002 | Ryaboy |
| 6,431,235 B1 | 8/2002 | Steinke |
| 6,447,702 B1 | 9/2002 | Ichihara |
| 6,450,222 B1 | 9/2002 | Fleming |
| 6,467,519 B1 | 10/2002 | Owen |
| 6,564,842 B2 | 5/2003 | Abinal et al. |
| 6,568,443 B2 | 5/2003 | Shoner |
| 6,588,539 B2 * | 7/2003 | Hinton et al. ................. 180/372 |
| 6,615,885 B1 | 9/2003 | Ohm |
| 6,640,859 B1 | 11/2003 | Laurent et al. |
| 6,648,039 B1 | 11/2003 | Bina |
| 6,679,012 B1 | 1/2004 | Chen et al. |
| 6,681,822 B2 | 1/2004 | Adams et al. |
| 6,698,480 B1 | 3/2004 | Cornelier |
| 6,719,025 B2 * | 4/2004 | Caretta .................. B60C 11/18 152/209.5 |
| 6,736,176 B2 | 5/2004 | Teratani |
| 6,769,465 B2 | 8/2004 | Rhyne et al. |
| 6,776,426 B2 | 8/2004 | Deal |
| 6,789,810 B2 | 9/2004 | Strong |
| 6,896,020 B1 | 5/2005 | Summers |
| 6,983,776 B2 | 1/2006 | Thompson et al. |
| 6,991,061 B2 | 1/2006 | Laurent |
| 6,994,134 B2 | 2/2006 | Grah |
| 6,994,135 B2 | 2/2006 | Delfino et al. |
| 7,013,939 B2 | 3/2006 | Rhyne et al. |
| 7,032,634 B2 | 4/2006 | Laurent et al. |
| 7,143,797 B2 | 12/2006 | Vannan |
| 7,152,641 B2 | 12/2006 | Ooyama |
| 7,174,936 B2 | 2/2007 | Becker et al. |
| 7,201,194 B2 | 4/2007 | Rhyne et al. |
| 7,231,948 B2 | 6/2007 | Forney, III et al. |
| 7,316,252 B1 * | 1/2008 | Heard ....................... 152/334.1 |
| 7,334,617 B2 | 2/2008 | Hill, III et al. |
| 7,418,988 B2 | 9/2008 | Cron et al. |
| 7,429,801 B2 | 9/2008 | Adamson et al. |
| 7,523,773 B2 | 4/2009 | Gabrys et al. |
| 7,546,862 B2 | 6/2009 | Moon et al. |
| 7,553,123 B2 | 6/2009 | Casaro |
| 7,650,919 B2 | 1/2010 | Rhyne et al. |
| 7,678,216 B2 * | 3/2010 | Sandstrom et al. ........ 156/110.1 |
| 7,743,806 B2 | 6/2010 | Abe |
| D630,566 S | 1/2011 | Ebel et al. |
| 7,950,428 B2 | 5/2011 | Hanada et al. |
| 7,980,282 B2 | 7/2011 | Moyna et al. |
| 8,104,524 B2 | 1/2012 | Manesh et al. |
| 8,109,308 B2 | 2/2012 | Manesh et al. |
| 8,176,957 B2 | 5/2012 | Manesh et al. |
| 8,434,533 B2 | 5/2013 | Albert et al. |
| 2002/0096237 A1 | 7/2002 | Burhoe et al. |
| 2003/0198775 A1 * | 10/2003 | Roth et al. ...................... 428/68 |
| 2003/0229326 A1 | 12/2003 | Hovis et al. |
| 2004/0012246 A1 | 1/2004 | Rhyne et al. |
| 2004/0069385 A1 | 4/2004 | Timoney et al. |
| 2004/0203304 A1 | 10/2004 | Almonacil et al. |
| 2005/0014437 A1 | 1/2005 | Yoshida |
| 2005/0076983 A1 | 4/2005 | Kimura et al. |
| 2006/0021257 A1 | 2/2006 | Hung |
| 2006/0113016 A1 | 6/2006 | Cron et al. |
| 2006/0174989 A1 | 8/2006 | Jones |
| 2007/0200265 A1 | 8/2007 | Forney, III et al. |
| 2007/0215259 A1 | 9/2007 | Burns |
| 2007/0267116 A1 * | 11/2007 | Rhyne et al. .................. 152/246 |
| 2008/0045643 A1 | 2/2008 | Henning et al. |
| 2008/0053586 A1 | 3/2008 | Hanada et al. |
| 2008/0073014 A1 | 3/2008 | Abe |
| 2008/0149247 A1 | 6/2008 | Heuze et al. |
| 2008/0169638 A1 | 7/2008 | Beyer-Meklenburg et al. |
| 2008/0220675 A1 | 9/2008 | Ikeno et al. |
| 2008/0314486 A1 | 12/2008 | Manesh et al. |
| 2009/0107596 A1 | 4/2009 | Palinkas et al. |
| 2009/0173421 A1 | 7/2009 | Love et al. |
| 2009/0211674 A1 * | 8/2009 | Hanada et al. .................. 152/53 |
| 2009/0211675 A1 | 8/2009 | Louden |
| 2009/0211678 A1 | 8/2009 | Palinkas et al. |
| 2009/0211681 A1 | 8/2009 | Palinkas et al. |
| 2009/0250149 A1 | 10/2009 | Sebe |
| 2009/0283185 A1 | 11/2009 | Manesh et al. |
| 2009/0294000 A1 | 12/2009 | Cron |
| 2009/0301625 A1 | 12/2009 | Moon et al. |
| 2010/0018621 A1 | 1/2010 | Thompsom |
| 2010/0071824 A1 | 3/2010 | Gardetto |
| 2010/0078111 A1 | 4/2010 | Anderson et al. |
| 2010/0132858 A1 | 6/2010 | Arakawa et al. |
| 2010/0132865 A1 * | 6/2010 | Iwase et al. .................. 152/301 |
| 2010/0193097 A1 | 8/2010 | McNier et al. |
| 2010/0200131 A1 | 8/2010 | Iwase et al. |
| 2010/0218869 A1 | 9/2010 | Abe |
| 2010/0260967 A1 | 10/2010 | Delfino et al. |
| 2010/0307653 A1 | 12/2010 | Delfino et al. |
| 2010/0314014 A1 * | 12/2010 | Burns ......................... 152/301 |
| 2011/0011506 A1 * | 1/2011 | Manesh et al. ............... 152/328 |
| 2011/0024008 A1 | 2/2011 | Manesh et al. |
| 2011/0030866 A1 | 2/2011 | Fadel et al. |
| 2011/0079335 A1 | 4/2011 | Manesh et al. |
| 2011/0180194 A1 * | 7/2011 | Anderson et al. ............ 152/520 |
| 2011/0240193 A1 | 10/2011 | Matsuda |
| 2011/0248554 A1 | 10/2011 | Chon et al. |
| 2012/0132332 A1 * | 5/2012 | Zhao ...................... B60C 11/00 152/209.5 |
| 2012/0234444 A1 | 9/2012 | Palinkas et al. |
| 2012/0241062 A1 | 9/2012 | Manesh et al. |
| 2012/0247635 A1 | 10/2012 | Manesh et al. |
| 2012/0318421 A1 | 12/2012 | Matsuda et al. |

FOREIGN PATENT DOCUMENTS

| | | |
|---|---|---|
| CN | 1072380 A | 5/1993 |
| CN | 1400115 A | 3/2003 |
| CN | 1154582 C | 6/2004 |
| CN | 2933918 Y | 8/2007 |
| CN | 102069682 A | 5/2011 |
| DE | 79 283 C | 2/1894 |
| DE | 2456420 A1 | 8/1976 |
| DE | 2610381 A1 | 10/1976 |
| DE | 2718374 A1 | 11/1977 |
| DE | 2825451 A1 | 12/1978 |
| DE | 4428516 A1 | 2/1996 |
| DE | 102006037666 A1 | 2/2008 |
| EP | 0071900 A2 | 2/1983 |
| EP | 0159888 A2 | 10/1985 |
| EP | 0353006 A2 | 1/1990 |
| EP | 0561222 A1 | 9/1993 |
| EP | 0401564 B1 | 3/1994 |
| EP | 552132 B1 | 1/1997 |
| EP | 0802865 B1 | 10/1997 |
| EP | 1123817 A2 | 8/2001 |
| EP | 1378377 A2 | 1/2004 |
| EP | 1902866 A1 | 3/2008 |
| EP | 1980420 A1 | 10/2008 |

(56) References Cited

FOREIGN PATENT DOCUMENTS

| | | |
|---|---|---|
| EP | 2430252 A1 | 3/2012 |
| FR | 10 476 E | 7/1909 |
| FR | 17 099 E | 6/1913 |
| FR | 2893274 A1 | 5/2007 |
| GB | 2024736 A | 1/1980 |
| GB | 2079685 A | 1/1982 |
| GB | 2305404 A | 4/1997 |
| JP | 01052501 A | 2/1989 |
| JP | 1311902 | 12/1989 |
| JP | 01314602 A | 12/1989 |
| JP | 01314603 A | 12/1989 |
| JP | 2179503 | 7/1990 |
| JP | 03025004 A | 2/1991 |
| JP | 3189202 | 8/1991 |
| JP | 03248901 A | 11/1991 |
| JP | 04027601 A | 1/1992 |
| JP | 04221201 A | 8/1992 |
| JP | 04221202 A | 8/1992 |
| JP | 06-109050 | 4/1994 |
| JP | 07-032827 | 2/1995 |
| JP | 2006044595 A * | 2/2006 ............. B60B 19/00 |
| JP | 2007112243 | 5/2007 |
| JP | 2007137207 | 6/2007 |
| JP | 2007238019 | 9/2007 |
| JP | 2007331708 | 12/2007 |
| JP | 2008044445 | 2/2008 |
| JP | 2008-068857 | 3/2008 |
| JP | 2008049943 | 3/2008 |
| JP | 2008132951 | 6/2008 |
| JP | 2008155859 | 7/2008 |
| JP | 2008162495 | 7/2008 |
| JP | 2008222038 | 9/2008 |
| JP | 2008302782 | 12/2008 |
| JP | 2009035050 | 2/2009 |
| JP | 2009-269413 | 11/2009 |
| JP | 2009286183 | 12/2009 |
| JP | 2009286208 | 12/2009 |
| JP | 2010137648 | 6/2010 |
| JP | 2011143874 | 7/2011 |
| JP | 2011183842 | 9/2011 |
| JP | 2012045958 | 3/2012 |
| JP | 2012076361 | 4/2012 |
| KR | 2010052990 | 5/2010 |
| NL | 6609460 A | 1/1967 |
| NL | 7006625 A | 11/1970 |
| NO | 864021 A | 10/1986 |
| RU | 2000958 C1 | 10/1993 |
| RU | 2099199 C1 | 12/1997 |
| RU | 2104880 C1 | 2/1998 |
| RU | 2155677 C2 | 9/2000 |
| RU | 2180290 C2 | 3/2002 |
| RU | 2279986 C1 | 7/2006 |
| SE | 8801421 | 10/1989 |
| SU | 1133121 A1 | 1/1985 |
| WO | WO 9819874 A1 | 5/1998 |
| WO | WO 9843833 A1 | 10/1998 |
| WO | WO 00/13923 A1 | 3/2000 |
| WO | WO 01/42033 A1 | 6/2001 |
| WO | WO 03/018332 A1 | 3/2003 |
| WO | WO 2006/039866 | 4/2006 |
| WO | WO 2006/116807 A1 | 11/2006 |
| WO | WO 2007/057975 A1 | 5/2007 |
| WO | WO 2007/080180 A1 | 7/2007 |
| WO | WO 2007/137375 A1 | 12/2007 |
| WO | WO 2008/050503 A1 | 5/2008 |
| WO | WO 2008/118983 A1 | 10/2008 |
| WO | WO 2009/135561 A2 | 11/2009 |
| WO | WO 2010/135464 A1 | 11/2010 |

OTHER PUBLICATIONS

International Search Report for International Application No. PCT/US2009/058652, dated Nov. 17, 2009; 2 pages.
International Search Report for International Application No. PCT/US2010/042613, dated Mar. 2, 2011; 4 pages.
Written Opinion for International Application No. PCT/US2010/042613, dated Mar. 2, 2011; 5 pages.
Written Opinion for International Application No. PCT/US2009/058652, dated Nov. 17, 2009; 6 pages.
Written Opinion for International Application No. PCT/US2008/058308, dated Aug. 7, 2008; 7 pages.
Chinese Office Action for Chinese Application No. 200880010003.6, dated Dec. 29, 2010; 13 pages.
International Search Report for International Application No. PCT/US2008/058308, dated Aug. 7, 2008; 2 pages.
International Search Report issued by the European Patent Office, for International Application No. PCT/US2013/031153, dated Aug. 29, 2013; 7 pages.
Written Opinion issued by the European Patent Office for International Application No. PCT/US2013/031153, dated Aug. 29, 2013; 10 pages.
International Preliminary Report on Patentability issued by the International Bureau of WIPO, Geneva, Switzerland, for International Application No. PCT/US2008/058308, dated Sep. 29, 2009; 6 pages.
International Preliminary Report on Patentability issued by the International Bureau of WIPO, Geneva, Switzerland, for International Application No. PCT/US2009/058652, dated Mar. 29, 2011; 7 pages.
International Preliminary Report on Patentability issued by the International Bureau of WIPO, Geneva, Switzerland, for International Application No. PCT/US2010/042613, dated Jan. 24, 2012; 6 pages.

* cited by examiner

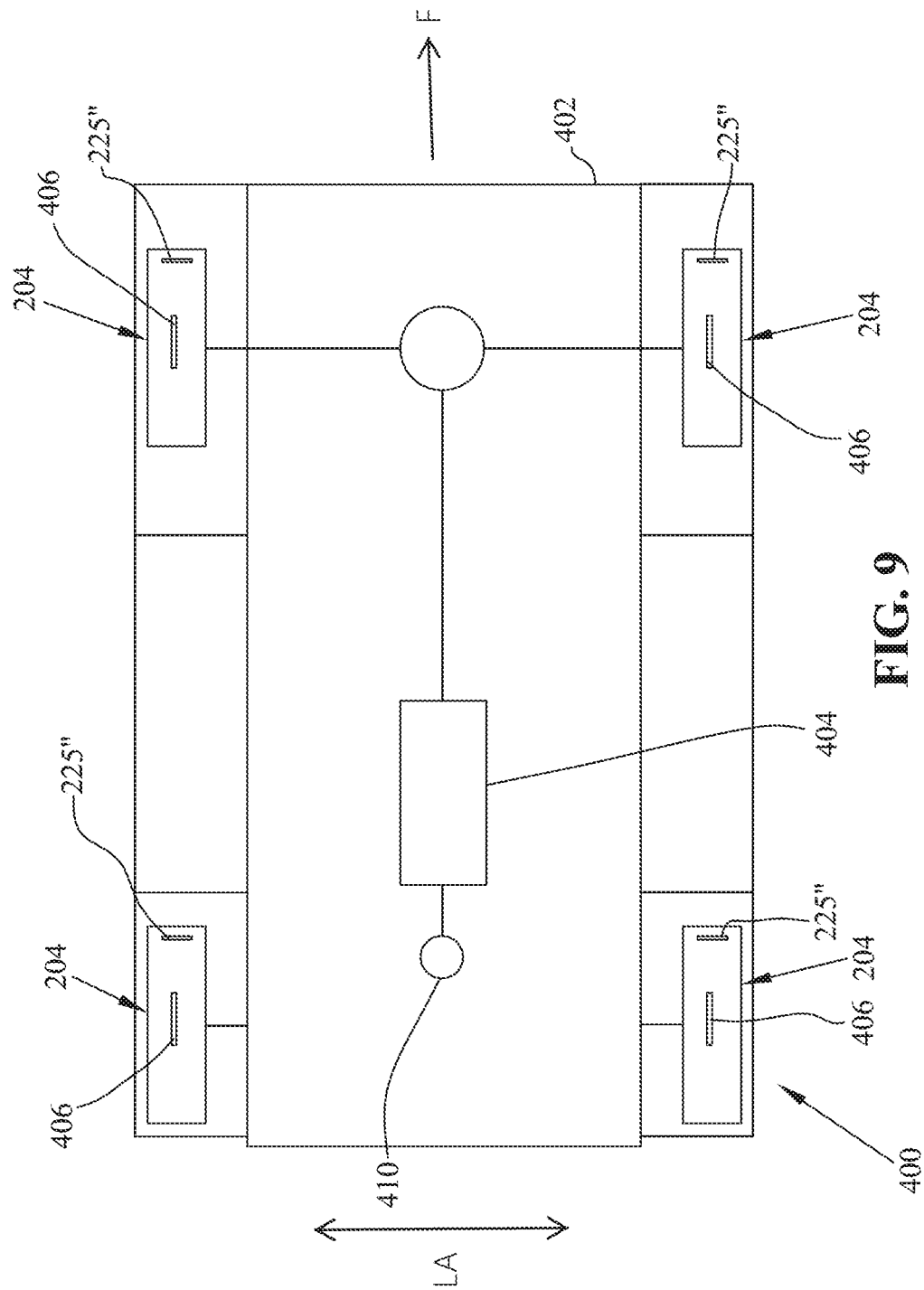

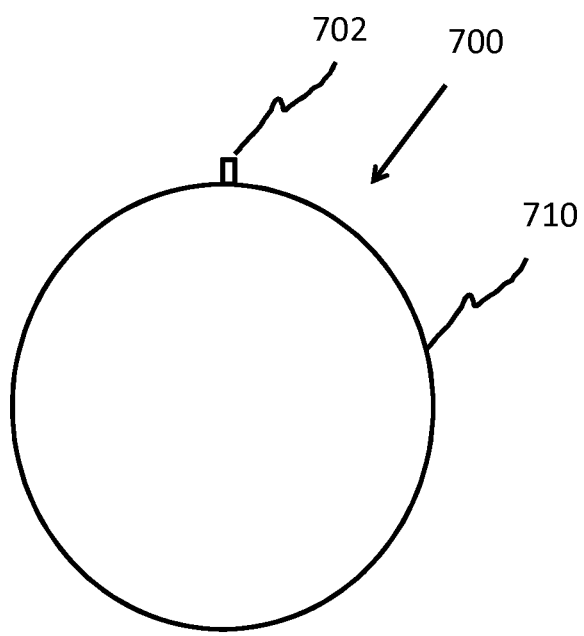
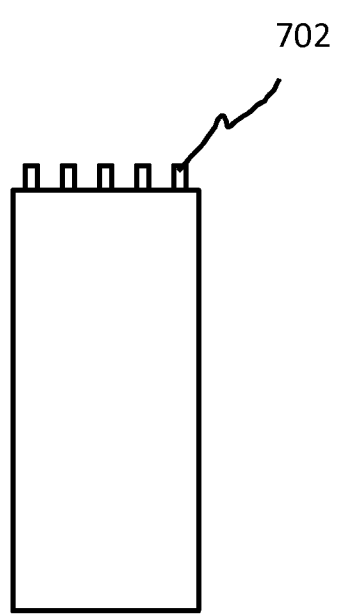
Fig 13A                    Fig 13B

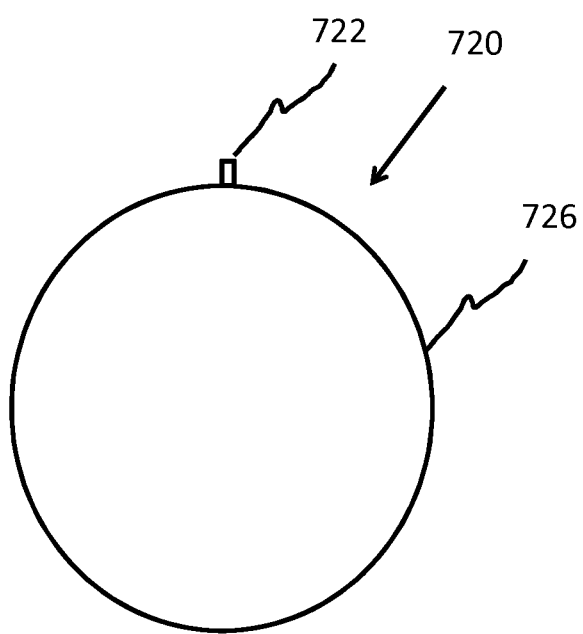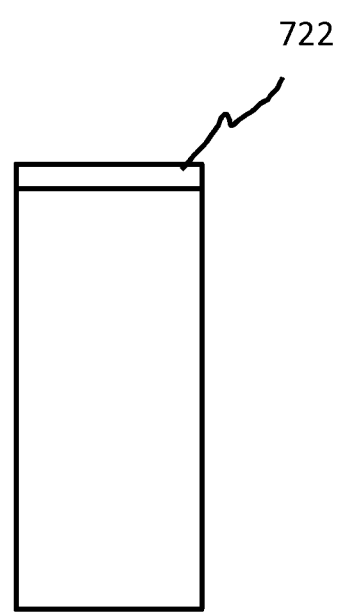
Fig 14A                    Fig 14B

NON-PNEUMATIC TIRE

This application claims priority to provisional patent application Ser. No. 61/611,300 filed Mar. 15, 2012, the subject matter of which is incorporated herein by reference.

BACKGROUND

The subject disclosure relates to non-pneumatic, or airless, tires (NPT).

Non-pneumatic, or airless, tires have historically been comprised largely of an entirely solid substance. These solid tires made the ride rather uncomfortable for passengers and caused greater damage to the suspension of a vehicle, which had to compensate for the lack of "give" in a solid tire. Eventually, it was found that putting pressurized air in tires created a more comfortable ride. However, along with their advantages, pneumatic tires still possess some drawbacks.

Loss of pressure causes the tire to flatten in the area where the load is applied, subjecting a larger portion of the tire to the load with every revolution, and leading to quicker degradation of the tire. Furthermore, a tire reliant upon pressurized air is susceptible to being punctured leading to rapid release of the pressurized air. Certain applications, such as military usage requires an NPT or run-flat tire for operation.

One recent version of NPT is shown in U.S. Pat. No. 8,109,308 entitled "Tension-based non-pneumatic tire", the subject matter of which is incorporated herein by reference.

SUMMARY

In one embodiment, a non-pneumatic tire comprises a rim having an axial centerline defining a tire rotational axis. A resilient wheel is positioned on the rim, the wheel comprising an inner ring, an outer ring and a plurality of flexible webs interconnected between the inner and outer rings, with the resilient wheel having an inner face and an outer face. A tread layer is positioned on the outer ring, and the stiffness of the resilient wheel at a position adjacent to the inner face is different than the stiffness of the resilient wheel at a position adjacent to the outer face.

In another embodiment, a vehicle comprises a frame and at least two wheels, comprising rims and tires. A propulsion device is coupled to at least one of the two wheels wherein at least one of the tires is a non-pneumatic tire. The one non-pneumatic tire comprises a rim having an axial centerline defining a tire rotational axis, a resilient wheel positioned on the rim, the wheel comprising an inner ring, an outer ring and a plurality of flexible webs interconnected between the inner and outer rings, the resilient wheel having an inner face and an outer face; and a tread layer positioned on the outer ring. The stiffness of the resilient wheel at a position adjacent to the inner face is different than the stiffness of the resilient wheel at a position adjacent to the outer face.

In another embodiment, a vehicle comprises a frame; at least two wheels, comprising rims and tires; and a propulsion device coupled to at least one of the two wheels. At least one of the tires is a non-pneumatic tire, comprising a rim having an axial centerline defining a tire rotational axis; a resilient wheel positioned on the rim, the wheel comprising an inner ring, an outer ring and a plurality of flexible webs interconnected between the inner and outer rings, the resilient wheel having an inner face and an outer face; and a tread layer positioned on the outer ring. The stiffness of the resilient wheel at a position adjacent to the inner face relative to the stiffness of the resilient wheel at a position adjacent to the outer face can be modified during vehicle operation.

In another embodiment, a non-pneumatic tire comprises a rim having an axial centerline defining a tire rotational axis and a resilient wheel positioned on the rim. The wheel comprises an inner ring, an outer ring and a plurality of flexible webs interconnected between the inner and outer rings, the resilient wheel having an inner face and an outer face and a plurality of openings defined in at least some of the webs between the inner and outer faces. Membranes are positioned in at least some of the openings; and a disc is coupled to either of the rim or the resilient wheel and substantially covering the openings.

In another embodiment, a non-pneumatic tire comprises a rim having an axial centerline defining a tire rotational axis and a resilient wheel positioned on the rim. The wheel comprises an inner ring, an outer ring and a plurality of flexible webs interconnected between the inner and outer rings, the outer ring having a width greater than the inner ring. A tread layer is positioned on the outer ring.

In yet another embodiment, a non-pneumatic tire comprises a rim having an axial centerline defining a tire rotational axis and a resilient wheel positioned on the rim. The wheel comprises an inner ring, an outer ring and a plurality of flexible webs interconnected between the inner and outer rings. A tread layer is positioned on the outer ring and the outer ring has an edge that overlaps the tread layer.

BRIEF DESCRIPTION OF THE DRAWINGS

FIG. 9 shows a diagrammatical view of a vehicle incorporating the embodiment of FIGS. 8A and 8B;

FIG. 13A shows a diagrammatical side view of an alternate wheel having upstanding studs;

FIG. 13B shows a diagrammatical end view of the wheel of FIG. 13A;

FIG. 14A shows a diagrammatical side view of an alternate wheel having transvere ribs;

FIG. 14B shows a diagrammatical end view of the wheel of FIG. 14A;

DETAILED DESCRIPTION

Figure 1:
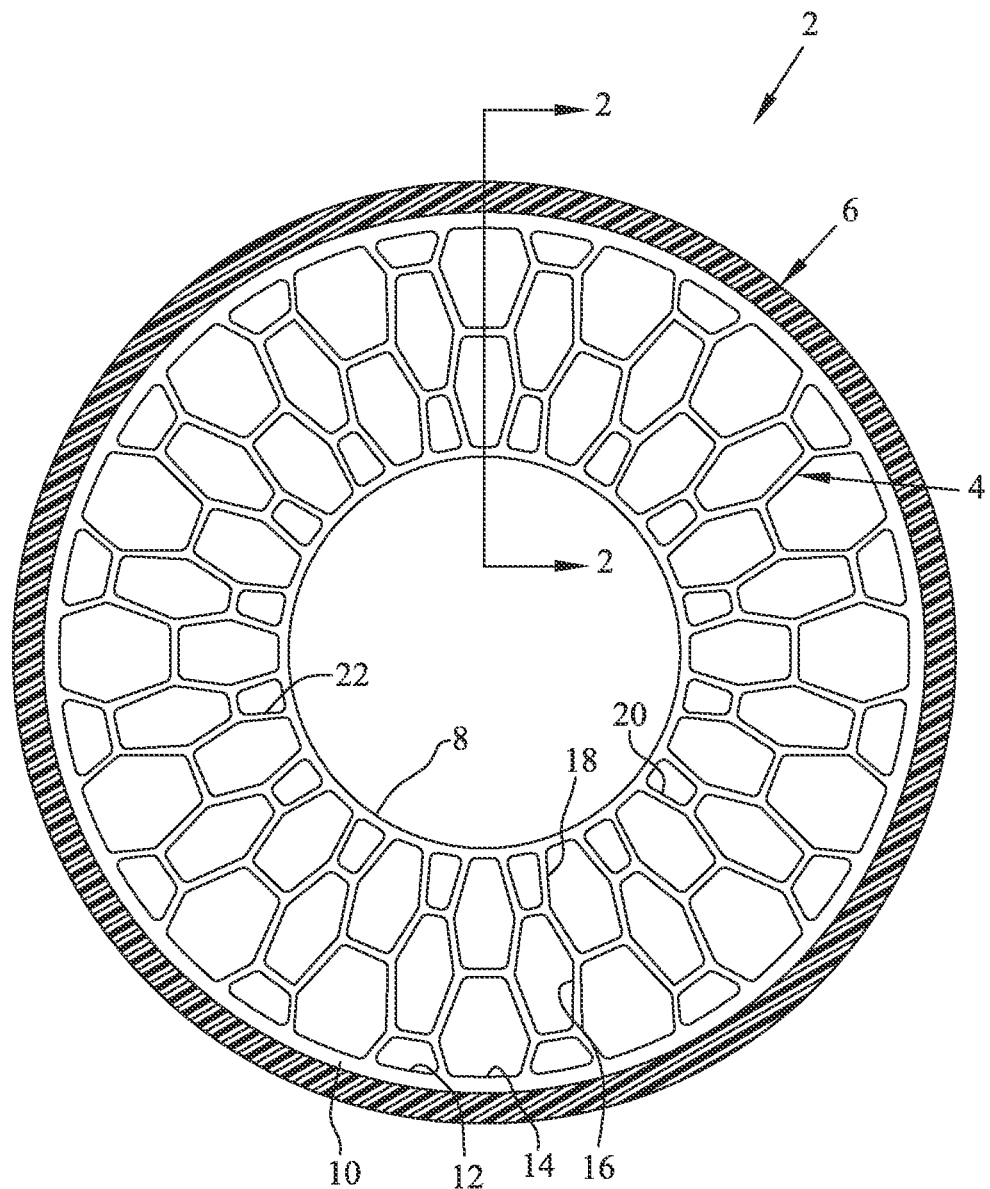
FIG. 1 is a side view of a first embodiment of the present disclosure.

With reference first to FIG. 1, a non-pneumatic tire is shown generally at 2 which comprises a resilient wheel 4 and an outer tread at 6. Resilient wheel 4 comprises an inner ring 8, an outer ring 10 and a plurality of webs 11 positioned between the inner and outer rings 8, 10 thereby defining a plurality of various sized openings 12, 14, 16, 18 and 20. It should be understood that the webs and the various openings may be made in multiple different configurations and orientations for the embodiments as disclosed herein. As shown in FIG. 1, the non-pneumatic tire 2 is similar to that shown in U.S. Pat. No. 8,019,308, entitled Tension-based Non-Pneumatic Tire, the subject matter of which is incorporated herein by reference.

Figure 2:
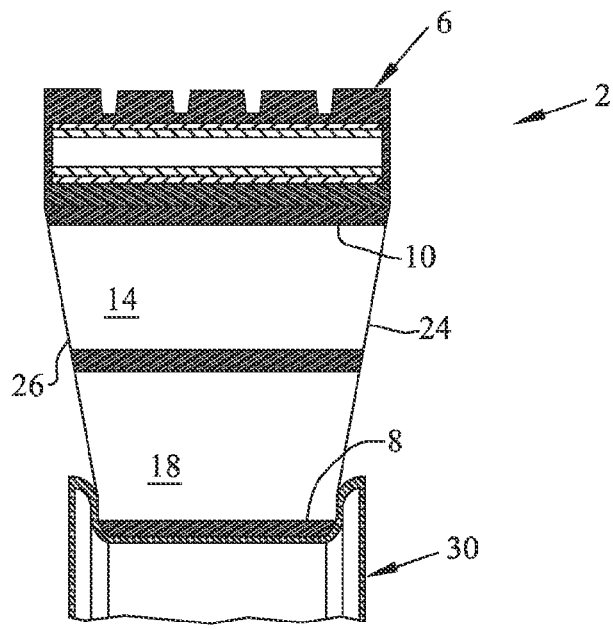
FIG. 2 is a cross-sectional view through lines 2-2 of FIG. 1.

With reference now to FIG. 2, non-pneumatic tire 2 is shown in cross-section, where the configuration of the inner ring 8 and outer ring 10 are shown in greater detail. As shown, the outer ring 10 has a wider expanse than the inner ring 8 which defines slanted faces 24, 26. As shown in the FIG. 2 embodiment, the non-pneumatic tire 2 is symmetrical and thus face 24 could be either the inner face or the outer face when mounted on a rim 30, where only the rim 30 defines the inner and outer position as should be appreciated by one skilled in the art.

Advantageously, the FIG. 2 embodiment provides for a wider footprint of tread 6 with a minimum depth wheel 30. The slanted faces 24 and 26, and in particular when the slanted face is an interface, provides further clearance for various components of the suspension.

Figure 3:
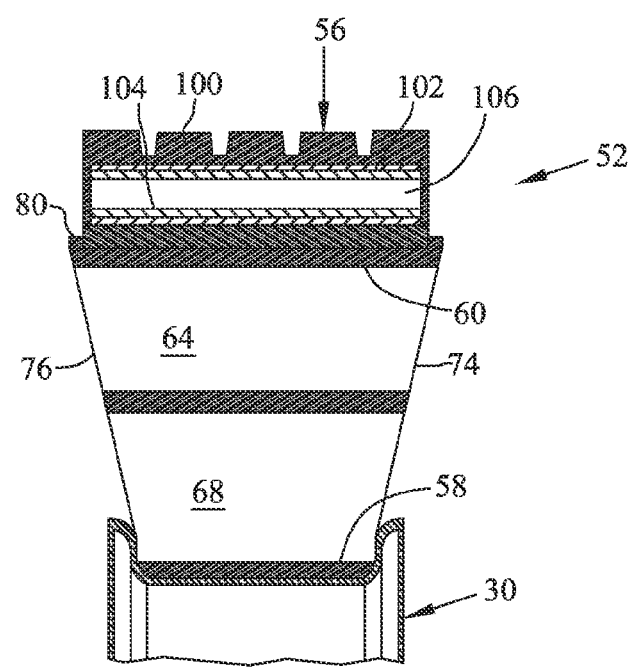
FIG. 3 is a view similar to FIG. 2 where the resilient wheel overlaps the tread.

With reference now to FIG. 3, the FIG. 2 embodiment can be modified such that the resilient wheel is provided with an outer ring 60 having a lip 80 adjacent to first slanted face 74 and second slanted face 76. This provides for retention of the tread 56 preventing tread 56 from becoming disengaged with outer ring 60. It should be understood that the FIG. 3 embodiment could be used with straight surfaces at 74, 76 (without a slanted surface).

With reference to FIGS. 2 and 3, it should be appreciated that treads 6 or 56 could include various layers such as a rubber layer at 100, layers such as 102, 104 which could be nylon or steel belts and an inner layer such as 106 which could be a further rigidifying or strengthening layer.

Figure 4:
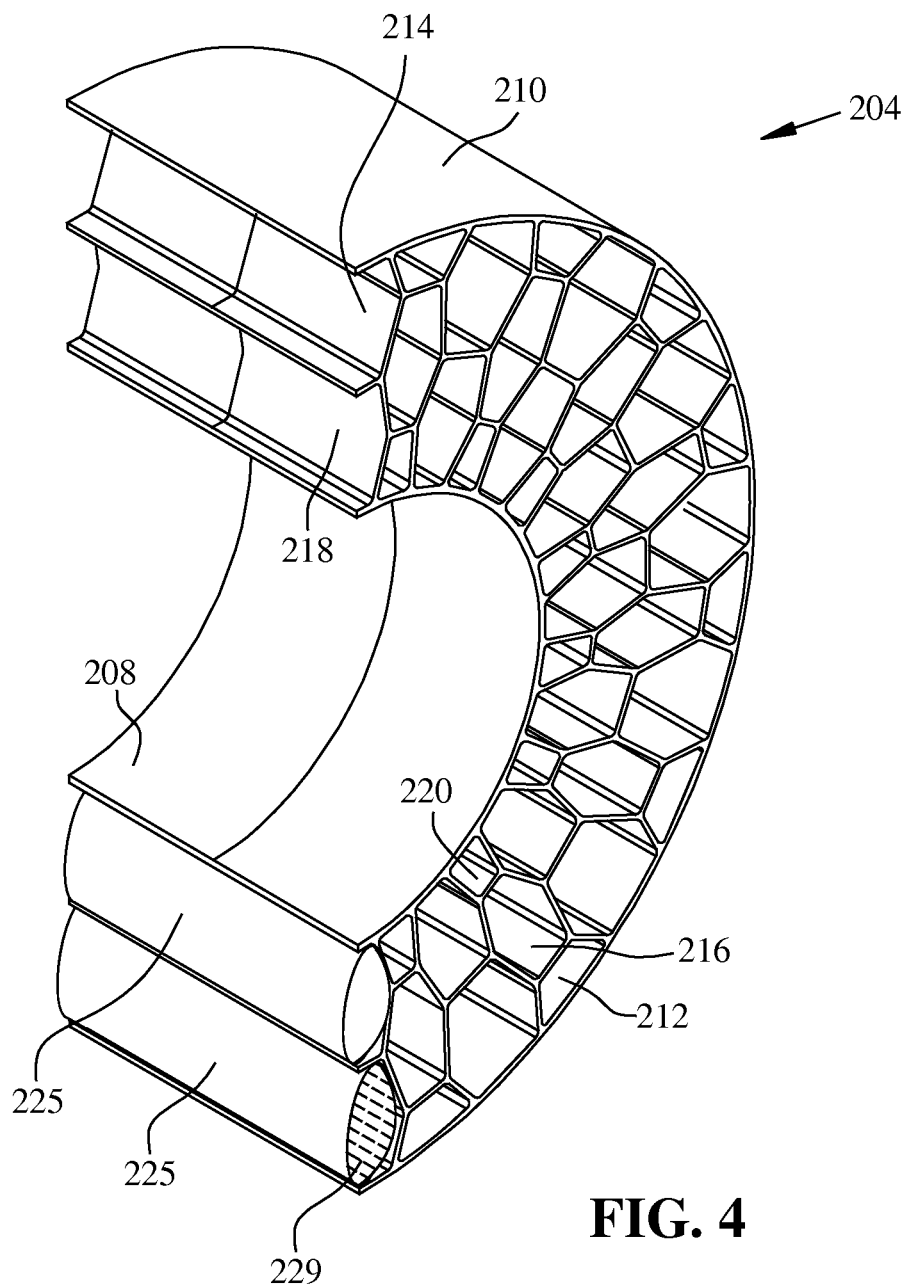
FIG. 4 depicts a second embodiment of the present disclosure.

With reference now to FIG. 4, a further embodiment of the resilient wheel is shown at 204 which includes an inner ring 208, an outer ring 210 with a plurality of openings 212, 214, 216, 218 and 220 defined between the inner and outer rings 208, 210. In this embodiment, at least one membrane 225 is positionable in at least one of the openings, in this case positioned in openings 214 and 218. These membranes could be individual inflation cells similar to that known as "TireBalls" available from TireBalls Inc. of Louisville, Ky. In another embodiment the cells 225 could be foam 229 (FIG. 4), either placed in and held in place by adhesive, or other fastening means; or could be injected in directly from a resin state. The foam could be of a single density or could have multiple foam components with different densities. For example, the density of the foam adjacent an inner side of the rim could be less dense or "softer" than a more dense or "stiffer" foam density adjacent an outer side of the rim to vary the stiffness of the wheel and tire overall performance.

Figure 5:
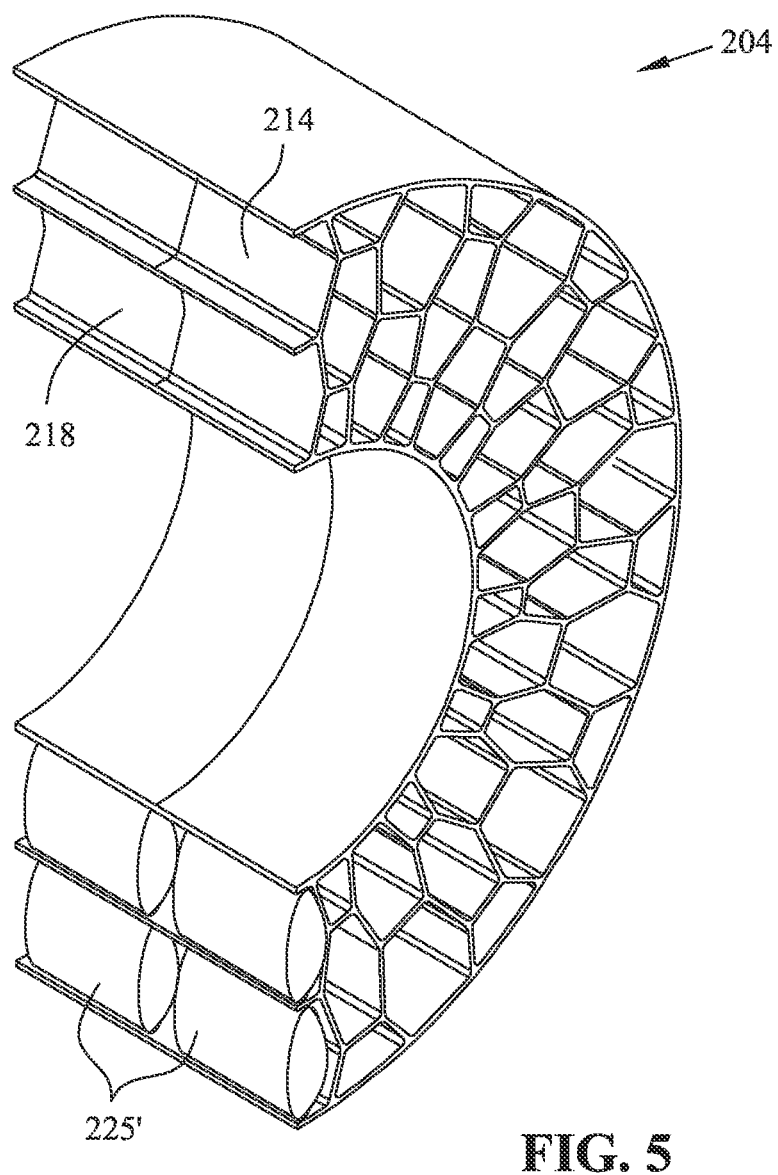
FIG. 5 is an alternate version of the embodiment shown in FIG. 4.

With respect now to FIG. 5, resilient wheel 204 could have multiple membranes such as inflatable cells 225' positioned in each of the openings 214, 218 as shown. These cells 225' could be similar to inflatable cells 225 and can be discrete from each other or could be interconnected to each other by a connection tubing. The membranes 225' could include one-way valves to allow inflation of both membranes together, but which prevent deflation of the remaining of the membranes when another membrane is punctured.

Figure 6:
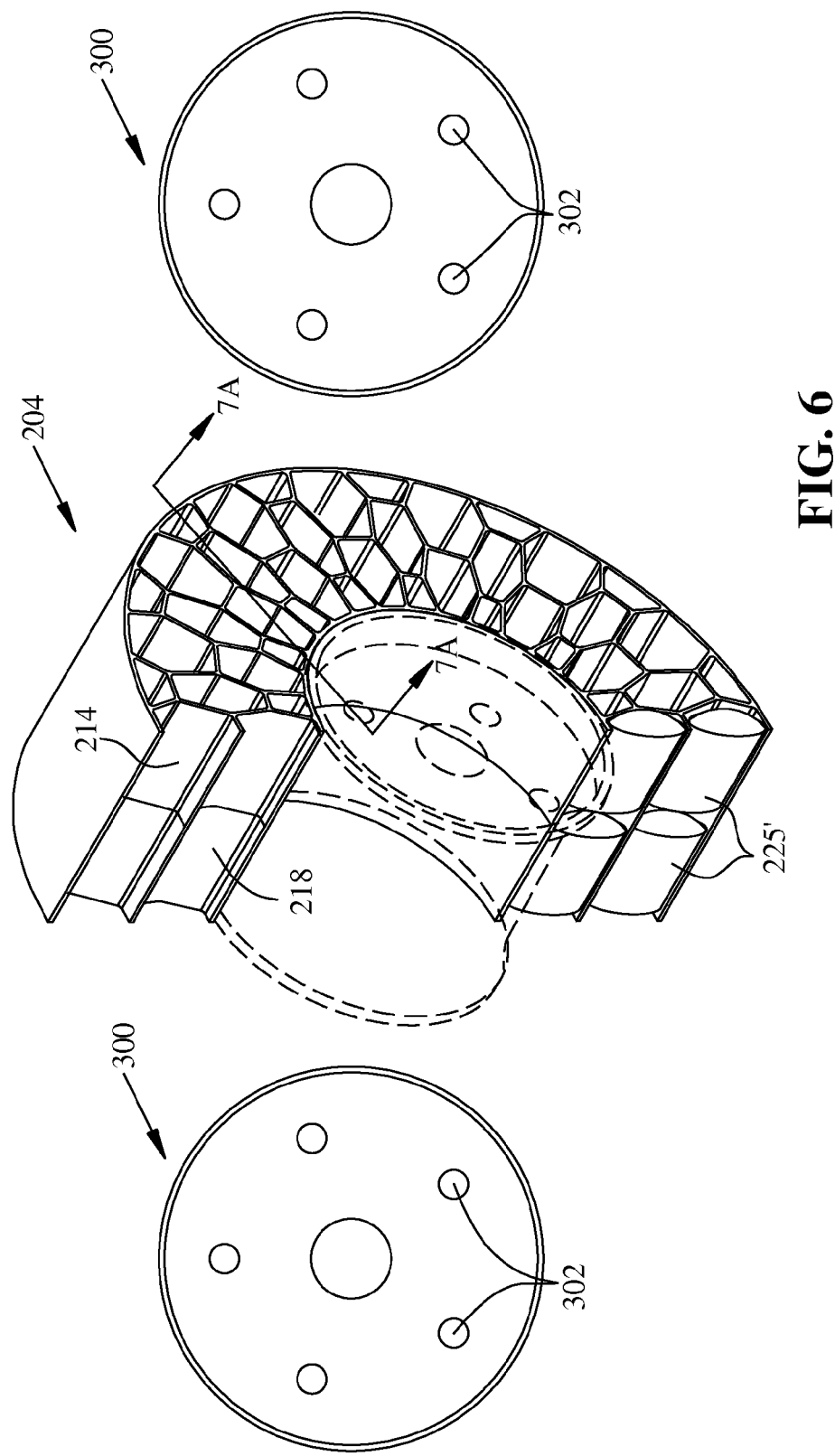
FIG. 6 shows a further revision of the FIG. 5 embodiment.
Figure 7A:
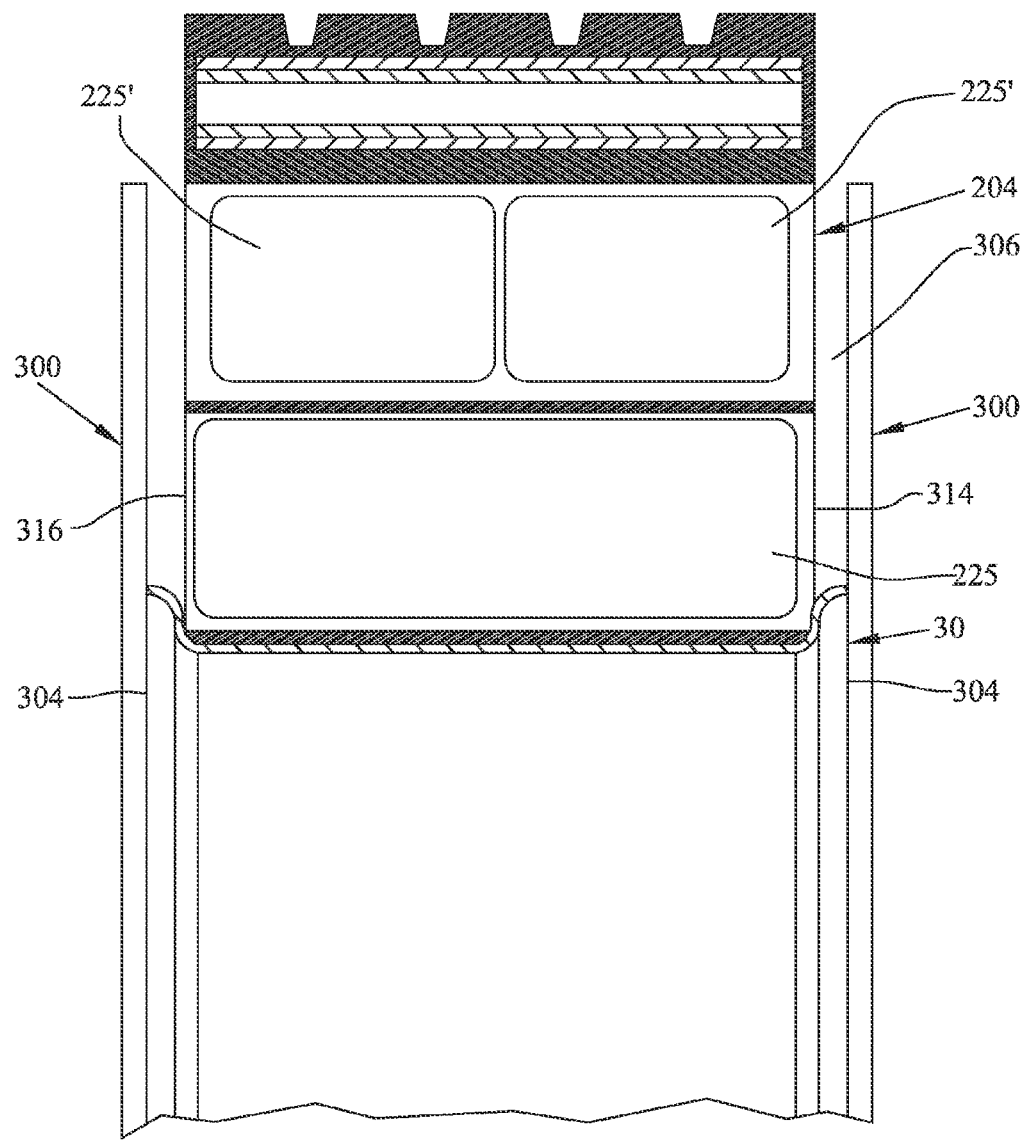
FIG. 7A shows a cross-sectional view through the embodiment of FIG. 6.
Figure 7B:
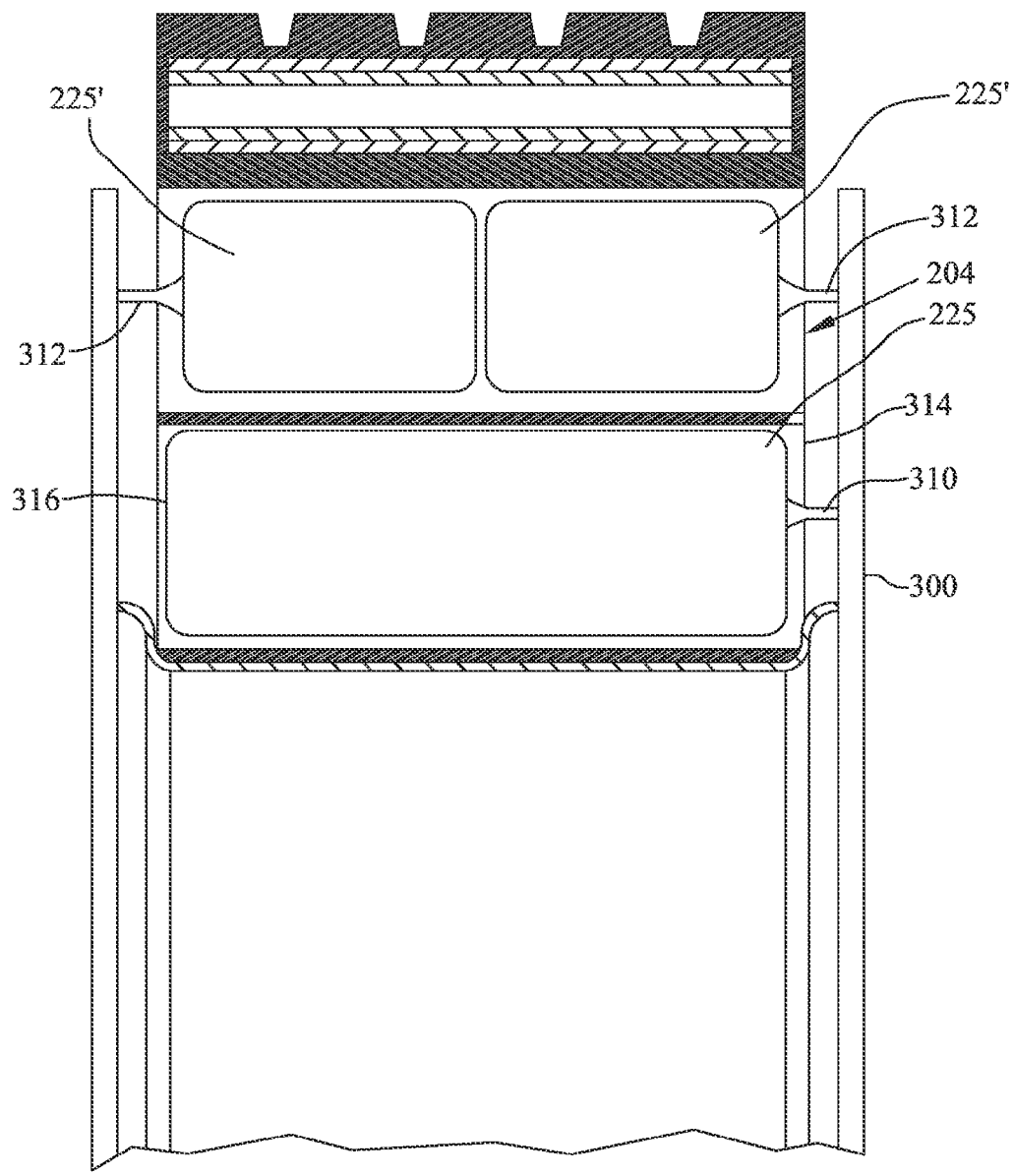
FIG. 7B shows a cross-sectional view of an alternate embodiment of FIG. 7A.

The FIG. 4 or FIG. 5 embodiment could be used in combination with disks 300 (FIG. 6) where disks 300 may be coupled to either of the rim or the resilient wheel by way of fasteners through apertures 302. FIG. 7A depicts an embodiment where the disks 300 are fixed to outer edges 304 of rims 30. This provides a space 306 intermediate resilient wheel 204 and disk 300 trapping membranes 225 or 225' therein. This also has the advantage of preventing mud, dirt and rocks from entering into the openings and chaffing either the openings or the membranes 225, 225'. As shown in FIG. 7B, a further embodiment is disclosed where membranes 225 are tethered to disk 300 by way of a cord 310 and membranes 225' are tethered to disks 300 by way of cords 312. Disk 300 could be a rigid member of metal or plastic material, or could be resilient or compliant and flex with the wheel.

In the previously mentioned embodiments, resilient wheel 204 has equal stiffness adjacent to first and second faces 314, 316. In some instances, it is desired to have the wheel stiffer adjacent to one or the other face. Providing an increased stiffness of the resilient wheel 204 adjacent to outer face 314 would position the tread contact point on the ground closer to outer face 314 which would simulate the stability of a wider track vehicle. With reference now to FIGS. 7C-8B, embodiments will be discussed which provide for varying stiffnesses along one of the wheel faces.

Figure 7C:
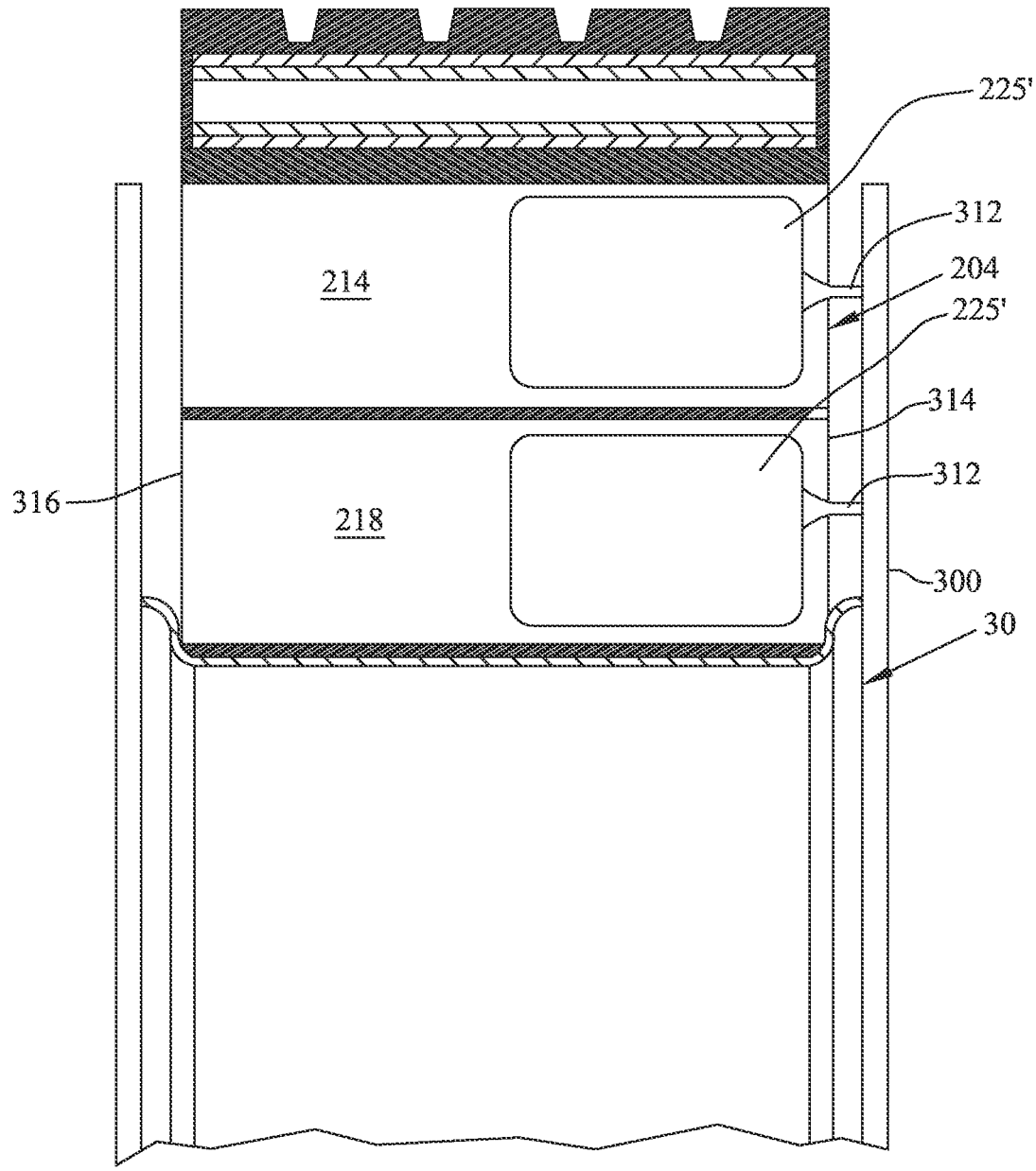
FIG. 7C shows a cross-sectional view of an alternate embodiment of FIG. 7A.

With reference first to FIG. 7C, openings 214 and 218 include a single membrane 225' positioned adjacent to face 314. This provides for increased stiffness of resilient wheel 204 adjacent to face 314. In the embodiment shown in FIG. 7C, face 314 would be the outer face of the rim 30.

Figure 8A:
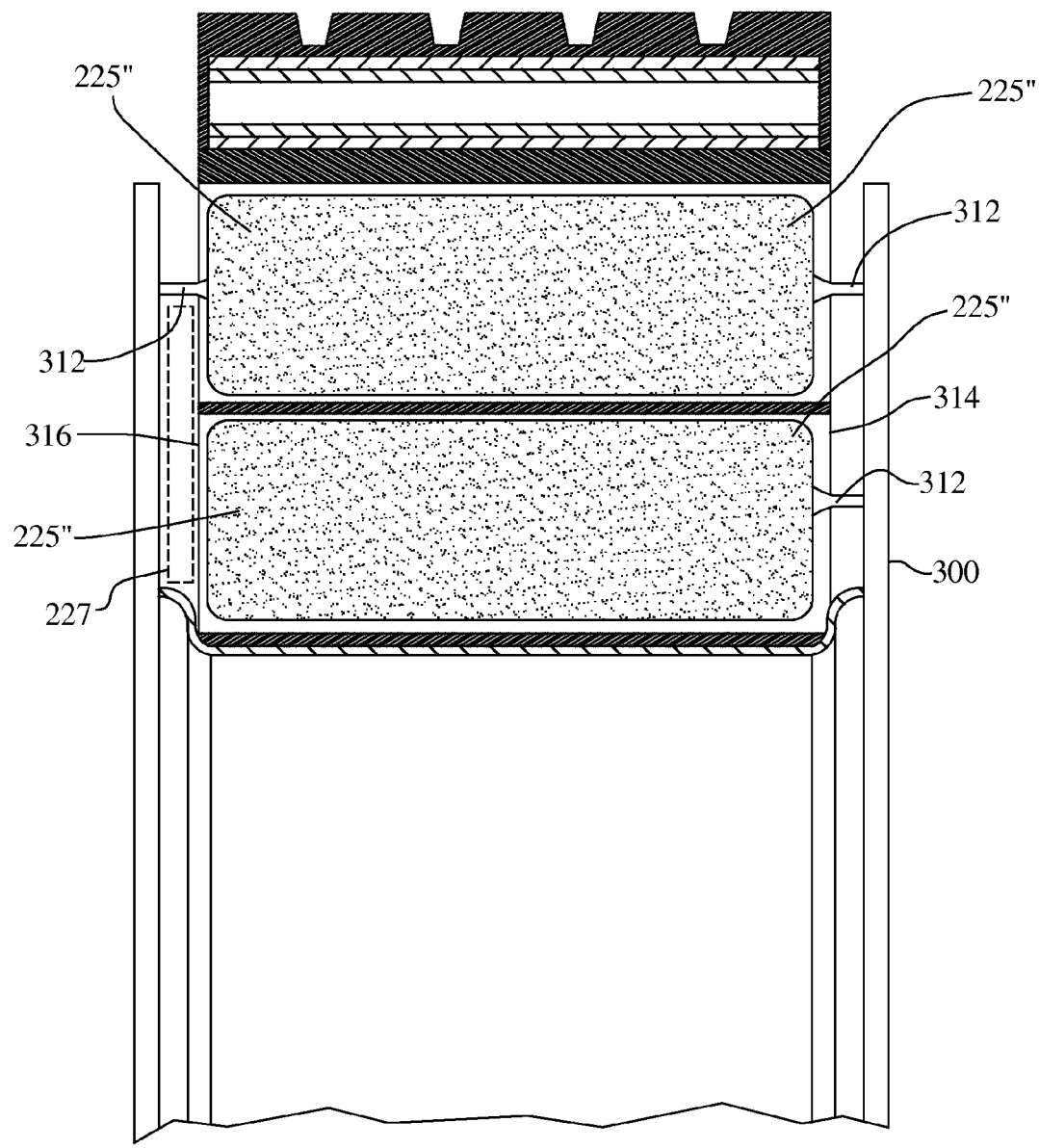
FIGS. 8A and 8B show cross-sectional views of a further embodiment.
Figure 8B:
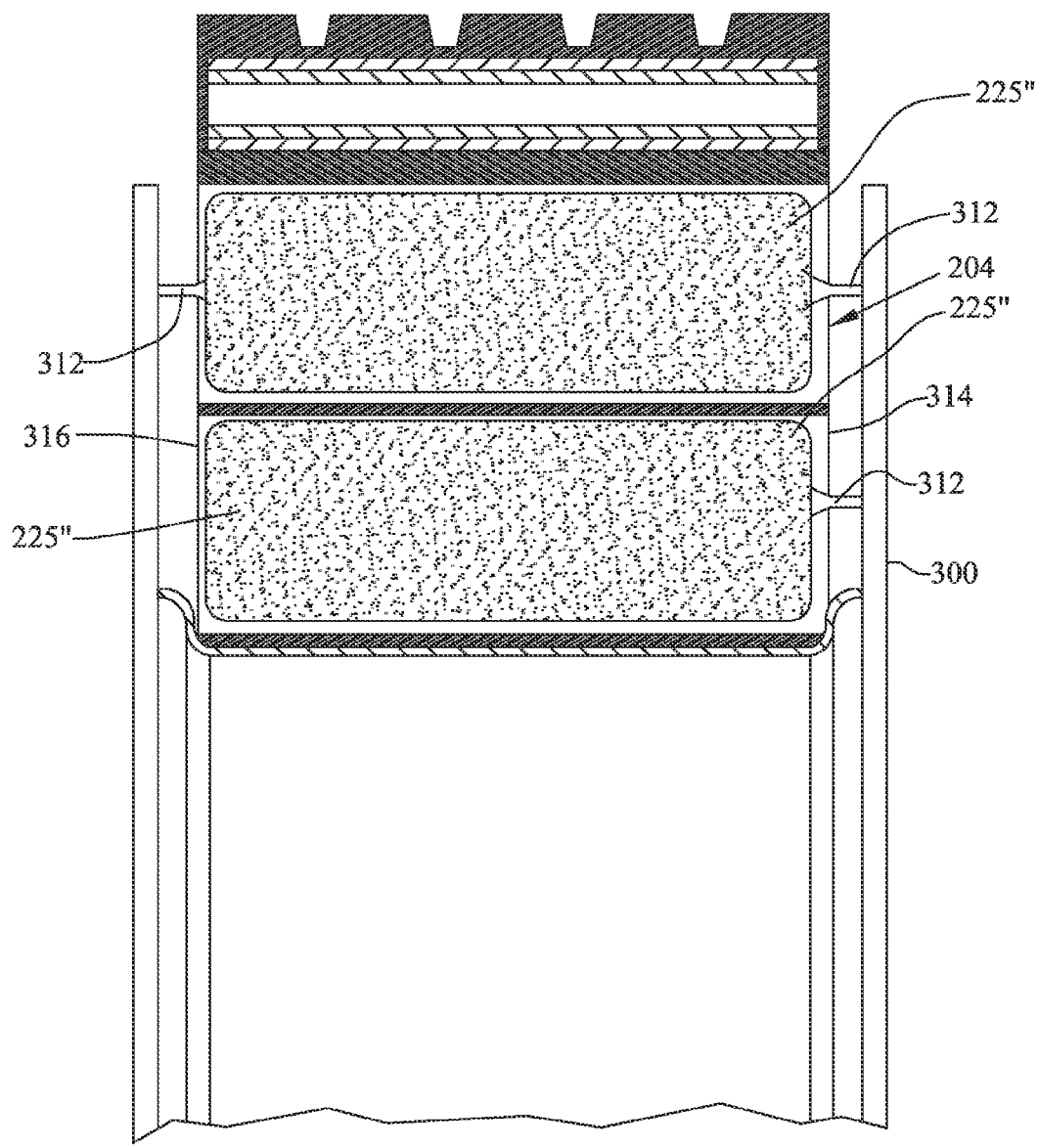

With reference now to FIGS. 8A and 8B, an alternate membrane 225" is shown which would include a magnetic fluid sometimes referred to as "magnetic smart fluid". FIG. 8A shows the membrane 225" in the free unexcited state with the magnetic particles of the magnetic fluid evenly dispersed throughout the membrane. With reference to 8B, membranes 225" are shown in the excited stage where the magnetic particles of the magnetic fluid attract to one side, in this case adjacent to outer face 314 thereby stiffening resilient wheel 204 adjacent to outer face 314. It should be appreciated that the wheel would be provided with a mechanism 227 for magnetically charging the magnetic particles in membranes 225" (FIG. 8A).

As shown in FIG. 9, the embodiments of FIGS. 8A and 8B could be used in a vehicle 400 including a frame 402, a propulsion device 404 which is coupled to at least two of the wheels 204 where the wheels 204 are provided with membranes 225" as described with respect with FIGS. 8A and 8B. Vehicle 400 further includes brakes 406 and stability control unit 410. Stability control unit 410 could be similar to that described in U.S. Pat. No. 7,966,113, entitled, "Vehicle Stability Control System", the subject matter of which is incorporated herein by reference. In this embodiment, stability control unit 410 would control brakes 406, membranes 225" and a throttle control unit of propulsion device 404.

That is, the vehicle 400 could include sensors utilized in stability control units such as accelerometers, yaw sensors and the like. Upon reaching a condition known to be unstable, the stability control unit 410 would react by applying the brakes, controlling the throttle and by exciting the membranes 225" to stiffen the resilient wheels adjacent the outside face as described above. It should be understood that multiple different scenarios are possible for controlling the deceleration of the vehicle. These could include serially applying all three deceleration methods, or applying the methods in parallel. It should also be appreciated that it may be necessary to excite the membranes in such a manner that some of the membranes are excited adjacent to the inner face and some are excited adjacent to the outer face.

For example, and with reference to FIG. 9, if the vehicle is travelling in the forward direction F, but accelerating laterally in the direction LA, it may be necessary to excite the membranes on the right hand side of the vehicle adjacent an outer face of the wheel and excite the membranes on the left hand side of the vehicle adjacent an inner face of the wheel.

Figure 10:
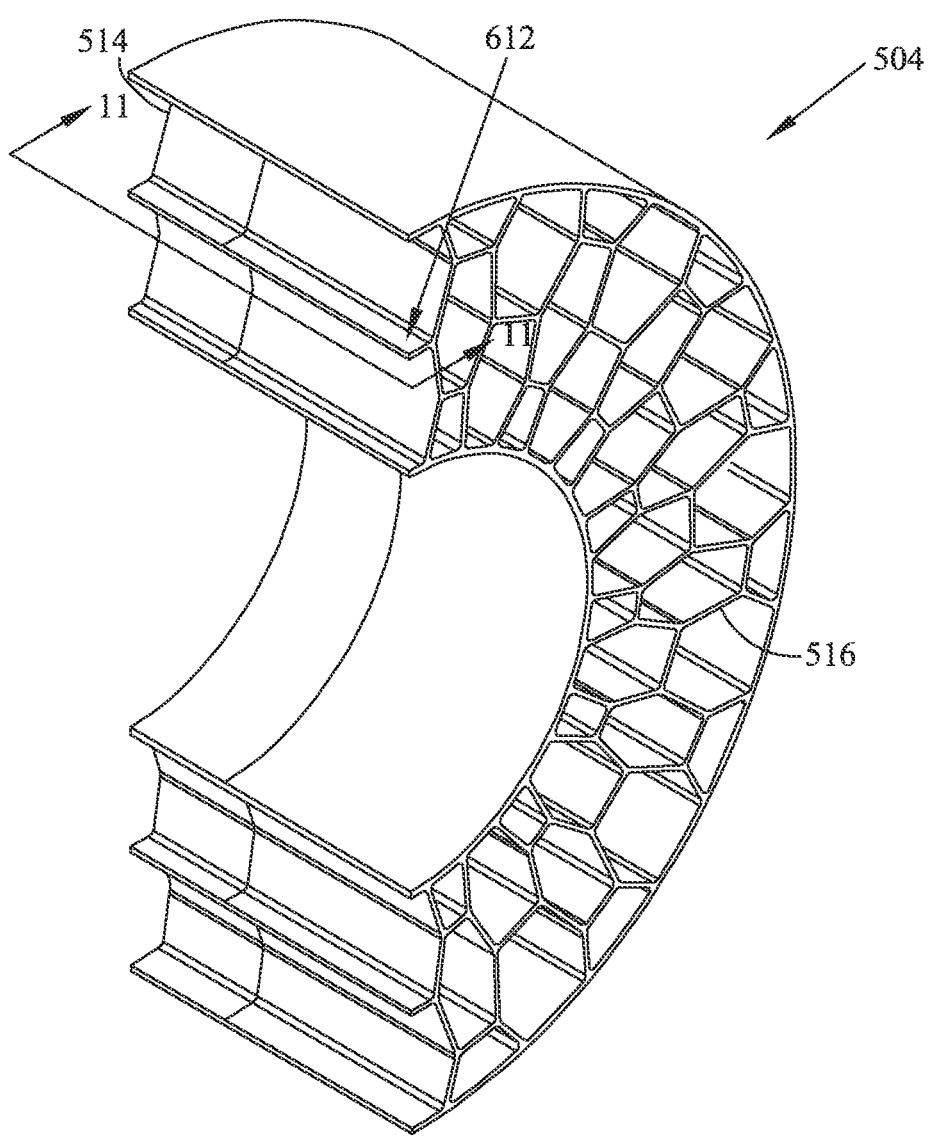
FIG. 10 shows another embodiment of the present disclosure.
Figure 12:
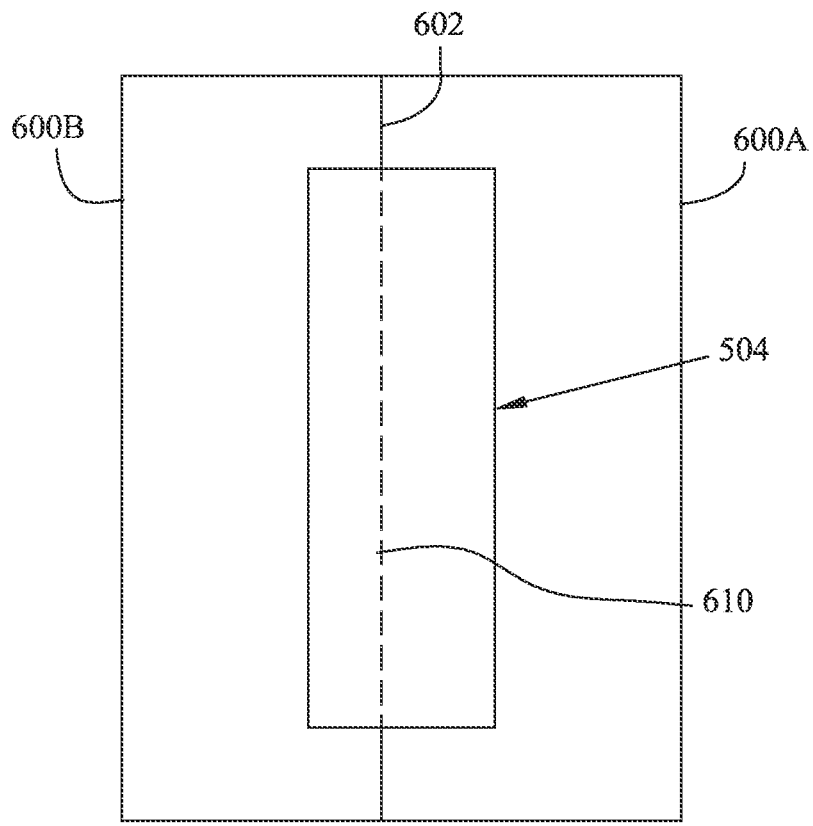
FIG. 12 depicts a diagrammatical view of a mold for molding the resilient wheel of FIG. 10.
Figure 11:
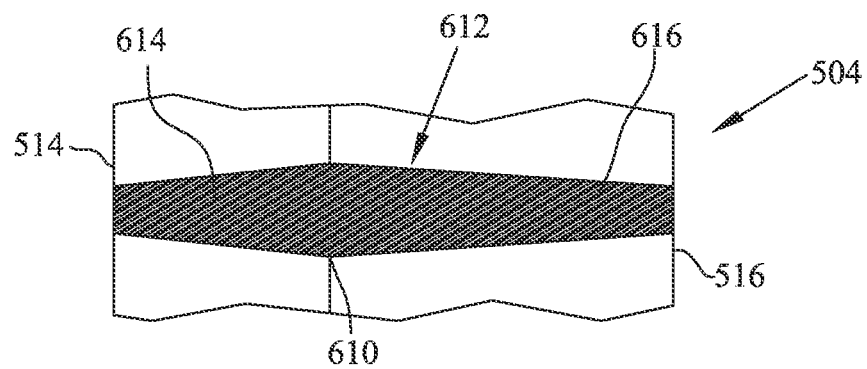
FIG. 11 shows a partial cross-sectional view as viewed in FIG. 10.

With reference now to FIGS. 10-12, yet another embodiment of the resilient wheel will be described. As shown best in FIG. 10, resilient wheel 504 is shown which is molded with an asymmetric geometry. As shown in FIG. 12, resilient wheel 504 is shown diagrammatically as being molded in molding die halves 600A, 600B having an asymmetric parting line at 602. As both mold tools 600A and 600B separate, the mold cavities that define the resilient wheel 504 has a slight draft angle and defines a parting line at 610, as shown in FIG. 12, which is coincident with parting line 602. This defines a transverse web 612 having a stiff portion at 614 and a more resilient portion 616 where stiffer portion 614 is positioned adjacent to outer face 514 of resilient wheel 504 and more resilient portion 616 is positioned adjacent inner face 516.

In another embodiment, air may be injected through openings 12, 14, 16, 18 and 20. This could be accomplished for cooling of the wheel 4 and or tread 6. This would also discharge mud or rocks from the openings 12, 14, 16, 18 and 20. A separate cooling fan could be provided to provide the air flow. Alternatively, air could be redirected from another source, for example from a CVT cooling air circuit, where the air discharged from a CVT cooling circuit is discharged through the wheel.

In another embodiment, the treads 6 or 56 could be molded directly onto the outer ring 10, 60 which eliminates a manufacturing step. Furthermore, features could be added to the outer surface of the outer ring 10, 60 such as upstanding pegs, transverse ribs, or circumferentially extending ribs or rings, which project into the rubber layer when tread is molded to the outer ring 10, 60, to assist in the retention of the molded rubber layer.

For example, and with reference to FIGS. 13A and 13B, a resilient wheel 700 has cylindrically shaped studs 702 which could upstand from the outer surface 704 of the outer ring 710. Only one row of studs 702 is shown, and it should be understood that multiple rows would circumscribe the wheel in any pattern desirable.

With reference to FIGS. 14A and 14B, another resilient wheel 720 has transversely extending ribs 722 which could upstand from the outer surface 724 of the outer ring 726. Only one row of ribs 722 is shown, and it should be understood that multiple ribs would circumscribe the wheel.

Figure 15A:
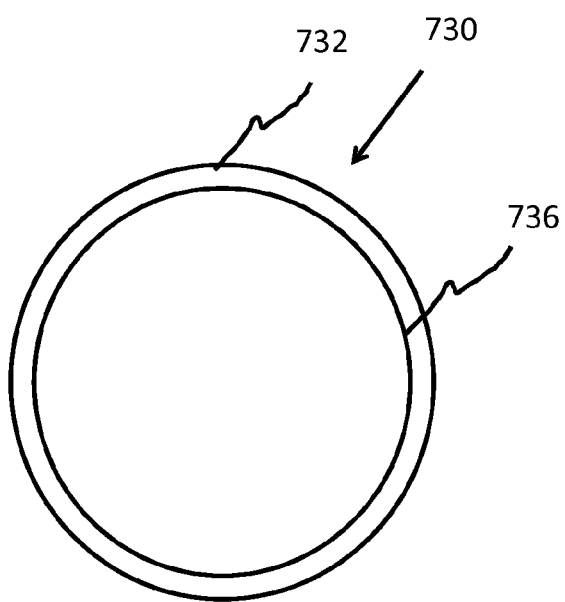
FIG. 15A shows a diagrammatical side view of an alternate wheel having circumferentially extending ribs.
Figure 15B:
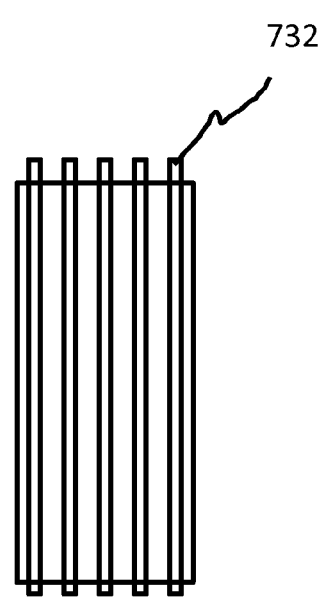
FIG. 15B shows a diagrammatical end view of the wheel of FIG. 15A.

With reference to FIGS. 15A and 15B, a further resilient wheel 730 has circumferentially extending ribs 732 which could upstand from the outer surface 734 of the outer ring 736.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A non-pneumatic wheel for contacting a ground surface, comprising:
   a rim having an axial centerline defining a wheel rotational axis;
   a resilient web positioned on the rim, the web comprising a radially inner ring, a radially outer ring and a plurality of flexible web elements interconnected between the radially inner and outer rings, the interconnected plurality of flexible web elements including a plurality of internal connections radially spaced apart from the radially inner ring and the radially outer ring and the resilient web having an axially inner face along the wheel rotational axis and an axially outer face along the wheel rotational axis; and
   a tread layer positioned on the radially outer ring and defining a contact surface of the wheel adapted to contact the ground surface,
   wherein the plurality of flexible web elements define a plurality of openings, and the flexible web elements are stiffened at a position intermediate the radially inner ring and radially outer ring to vary the stiffness of the resilient web at one of a position adjacent to the axially inner face and a position adjacent to the axially outer face, and the resilient web is radially spaced apart from the contact surface.

2. The non-pneumatic wheel of claim 1, wherein the stiffness of the resilient web at a position adjacent to the axially outer face is greater than the stiffness of the resilient web at a position adjacent to the axially inner face.

3. The non-pneumatic wheel of claim 2, wherein the flexible web elements have varying dimensions that alter the stiffness of at least a portion of the resilient web.

4. The non-pneumatic wheel of claim 1, wherein the flexible web elements have varying dimensions that alter the stiffness of at least a portion of the resilient web.

5. The non-pneumatic wheel of claim 4, wherein a parting line for the resilient web is asymmetric.

6. The non-pneumatic wheel of claim 1, wherein the plurality of flexible web elements include filled membranes positioned in at least one of the openings that vary the stiffness of at least a portion of the resilient web.

7. The non-pneumatic wheel of claim 6, wherein the membranes are air filled.

8. The non-pneumatic wheel of claim 6, wherein the membranes are comprised of foam.

9. The non-pneumatic wheel of claim 8, wherein the membranes are discrete.

10. The non-pneumatic wheel of claim 9, wherein at least one of the membranes is interconnected to at least one of the adjacent membranes.

11. The non-pneumatic wheel of claim 6, wherein the membranes are filled with a magnetic material.

12. The non-pneumatic wheel of claim 11, further comprising a charging mechanism to electrically charge the magnetic material and thereby change the viscosity of the magnetic material.

13. A vehicle, comprising:
a frame;
at least two wheels for contacting a ground surface;
a propulsion device coupled to at least one of the two wheels;
wherein at least one of the wheels is a non-pneumatic wheel, comprising:
a rim having an axial centerline defining a wheel rotational axis;
a resilient web positioned on the rim, the web comprising a radially inner ring, a radially outer ring and a plurality of flexible web elements interconnected between the radially inner and outer rings, the interconnected plurality of flexible web elements including a plurality of internal connections radially spaced apart from the radially inner ring and the radially outer ring and the resilient web having an axially inner face along the wheel rotational axis and an axially outer face along the wheel rotational axis; and
a tread layer positioned on the radially outer ring and defining a contact surface of the wheel adapted to contact the ground surface;
wherein the plurality of flexible web elements define a plurality of openings, and at least one of the openings includes at least one membrane that varies the stiffness of the resilient web at one of a position adjacent to the axially inner face and a position adjacent to the axially outer face, and the resilient web is radially spaced apart from the contact surface.

14. The vehicle of claim 13, wherein the stiffness of the resilient web at a position adjacent to the axially outer face is greater than the stiffness of the resilient web at a position adjacent to the axially inner face.

15. The vehicle of claim 14, wherein the flexible web elements have varying dimensions that alter the stiffness of at least a portion of the resilient web.

16. The vehicle of claim 13, wherein the flexible web elements have varying dimensions that alter the stiffness of at least a portion of the resilient web.

17. The vehicle of claim 16, wherein a parting line for the resilient web is asymmetric.

18. The vehicle of claim 13, wherein a state of the membranes can be modified to change the stiffness of the resilient web.

19. The vehicle of claim 18, wherein the membranes are air filled.

20. The vehicle of claim 19, wherein the membranes are discrete.

21. The vehicle of claim 20, wherein the membranes are interconnected.

22. The vehicle of claim 18, wherein the membranes are filled with a magnetic material.

23. The vehicle of claim 22, further comprising a charging mechanism to electrically charge the magnetic material and thereby change the viscosity of the magnetic material.

24. The vehicle of claim 18, further comprising a tire cooling system fluidly coupled to the two wheels for blowing air through the resilient web.

25. The tire of claim 1, wherein the tread layer radially surrounds the resilient web.

26. The tire of claim 1, wherein at least one of the plurality of flexible web elements extends substantially perpendicular to the radial direction of the tire.

27. The tire of claim 1, wherein the plurality of openings are generally hexagonally shaped openings circumferentially spaced around said tire and radially spaced at varying distances from the wheel rotational axis, a first plurality of generally quadrilaterally-shaped openings adjacent the radially inner ring and a second plurality of generally quadrilaterally-shaped openings adjacent the radially outer ring, each of said first plurality of generally quadrilaterally-shaped openings and each of said second plurality of generally quadrilaterally-shaped openings circumferentially separated from each other of the first plurality of generally quadrilaterally-shaped openings and each other of the second plurality of generally quadrilaterally-shaped openings, respectively, by at least one of the plurality of hexagonally-shaped openings, so as to support a load by working in tension.

28. The tire of claim 6, wherein at least one opening comprises at least two membranes, the at least two membranes being axially aligned within the at least one opening.

29. The tire of claim 1, wherein each of the plurality of internal connections joins at least three adjacent web elements.

30. The tire of claim 1, wherein at least one of the openings is generally hexagonally shaped.

31. The tire of claim 1, wherein the openings comprise of a first plurality of generally polygonal openings having a first number of sides and a second plurality of generally polygonal openings having a second number of sides, the second number being less than the first number.

32. The vehicle of claim 23, wherein the magnetic material is selectively electrically charged.

* * * * *